US012223230B2

(12) United States Patent
Usui

(10) Patent No.: US 12,223,230 B2
(45) Date of Patent: Feb. 11, 2025

(54) METHODS AND SYSTEMS FOR GENERATING AN INSTANT DESIGN FOR MANUFACTURABILITY OF A PART AT A COMPUTING DEVICE

(71) Applicant: Protolabs, Inc., Maple Plain, MN (US)

(72) Inventor: Shuji Usui, Minneapolis, MN (US)

(73) Assignee: Protolabs, Inc., Maple Plain, MN (US)

( * ) Notice: Subject to any disclaimer, the term of this patent is extended or adjusted under 35 U.S.C. 154(b) by 535 days.

(21) Appl. No.: 17/205,022

(22) Filed: Mar. 18, 2021

(65) Prior Publication Data

US 2021/0303743 A1 Sep. 30, 2021

Related U.S. Application Data

(60) Provisional application No. 62/993,835, filed on Mar. 24, 2020.

(51) Int. Cl.
| | | |
|---|---|---|
| *G06F 30/10* | (2020.01) | |
| *G06F 30/27* | (2020.01) | |
| *G06F 111/20* | (2020.01) | |
| *G06F 119/18* | (2020.01) | |

(52) U.S. Cl.
CPC ............. *G06F 30/10* (2020.01); *G06F 30/27* (2020.01); *G06F 2111/20* (2020.01); *G06F 2119/18* (2020.01)

(58) Field of Classification Search
CPC .. G06F 2111/20; G06F 2119/18; G06F 30/10; G06F 30/27
See application file for complete search history.

(56) References Cited

U.S. PATENT DOCUMENTS

| | | |
|---|---|---|
| 8,923,999 B2 | 12/2014 | Balkenende |
| 9,367,063 B2 | 6/2016 | Herrman |
| 10,061,870 B2 | 8/2018 | Nelaturi |
| 10,281,902 B2 | 5/2019 | Coffman |

(Continued)

OTHER PUBLICATIONS

Rossignac, Jaroslaw R., and Aristides AG Requicha. "Depth-buffering display techniques for constructive solid geometry." IEEE Computer Graphics and Applications 6.9 (1986): 29-39.*

(Continued)

*Primary Examiner* — Nithya J. Moll
(74) *Attorney, Agent, or Firm* — Caldwell Intellectual Property Law

(57) ABSTRACT

A system for generating an instant design for manufacturability of a part includes a computing device configured to receive a representative part model, wherein the representative part model comprises a plurality of sides, to generate, at a graphics processing unit, a depth buffer model of the representative part model, to determine, at an assignment module operating on the graphics processing unit, each orientation of the plurality of orientations of the representative part model as a function of each depth buffer of the plurality of depth buffers, and to generate, at a simulation module operating on the graphics processing unit, a prospective part, wherein generating a prospective part further comprises generating a simulated casing of the representative part model. The system is further designed and configured to display the prospective part to a user device.

16 Claims, 7 Drawing Sheets

(56) References Cited

U.S. PATENT DOCUMENTS

| | | |
|---|---|---|
| 10,372,109 B2 | 8/2019 | Desimone |
| 2006/0129462 A1 | 6/2006 | Pankl |
| 2013/0144566 A1 | 6/2013 | De Biswas |
| 2015/0269282 A1* | 9/2015 | Nelaturi .................. G06F 30/00 700/98 |
| 2015/0269290 A1* | 9/2015 | Nelaturi .................. G06F 30/20 703/6 |
| 2017/0220028 A1 | 8/2017 | Nelaturi |

OTHER PUBLICATIONS

Sortino, Marco, et al. "Compensation of geometrical errors of CAM/CNC machined parts by means of 3D workpiece model adaptation." Computer-Aided Design 48 (2014): 28-38.*

Nelaturi, Saigopal, et al. "Automatic spatial planning for machining operations." 2015 IEEE international conference on automation science and engineering (CASE). IEEE, 2015.*

Carter, Jeremy A., Thomas M. Tucker, and Thomas R. Kurfess. "3-axis cnc path planning using depth buffer and fragment shader." Computer-Aided Design and Applications 5.5 (2008): 612-621.*

Reference Notes: https://www.mdpi.com/2504-4494/3/4/84/pdf (Journal of Manufacturing and Materials Processing 3, No. 4 (2019): 84) Title: Automated Unsupervised 3D Tool-Path Generation Using Stacked 2D Image Processing Technique by: Tadele Belay Tuli Date: Oct. 1, 2019.

Reference Notes: ASME 2012 International Design Engineering Technical Conferences and Computers and Information in Engineering Conference, pp. 77-88 Title: A graph grammar based approach to automated manufacturing planning Date: Aug. 12, 2012 by: Wentao Fu.

Reference Notes: Computer-Aided Design 59 (2015): 1-14 Title: Cloud-based design and manufacturing: A new paradigm in digital manufacturing and design innovation Date: Feb. 1, 2015 by: Dazhong Wu.

Reference Notes: Proceedings of the 2017 Industrial and Systems Engineering Research Conference, pp. 860-865 Title: Automated Manufacturability Analysis for Conceptual Design in New Product Development Date: May 2017 Bye: Michael Hoefer.

Reference Notes: Journal of Manufacturing Systems 33, No. 4 (2014): 498-507 Title: Virtual machining considering dimensional, geometrical and tool deflection errors in three-axis CNC milling machines Date: Oct. 1, 2014 by: Mohsen Soori.

* cited by examiner

METHODS AND SYSTEMS FOR GENERATING AN INSTANT DESIGN FOR MANUFACTURABILITY OF A PART AT A COMPUTING DEVICE

CROSS-REFERENCE TO RELATED APPLICATIONS

This application claims priority to Provisional Application No. 62/993,835 filed on Mar. 24, 2020 and entitled "METHODS AND SYSTEMS FOR GENERATING AN INSTANT DESIGN FOR MANUFACTURABILITY OF A PART AT A COMPUTING DEVICE" the entirety of which is incorporated herein by reference.

FIELD OF THE INVENTION

The present invention generally relates to the field of computer-aided design and structure fabrication. In particular, the present invention is directed to methods and systems for generating an instant design for manufacturability of a part at a computing device.

BACKGROUND

Computer-aided drawings typically convey information about a to-be-fabricated structure, such as a part or an assembly of components of a part. These parts included in a computer-aided drawing are not designed in view of design-for-manufacturability constraints. Design-for-manufacturability constraints include the time required to machine the product, set-up time of the computer numeric control machine, material type, geometric tolerance, volume of the material to be machined, and the like. Additionally, design-for-manufacturability constraints may include constraints on overhangs and free spans, minimum angels, and minimum section thickness. Designing a part in view of design-for-manufacturability constraints facilitates the manufacturing process required to reduce manufacturing by limiting undesirable leftover material due to the limitation of the machining process. The leftover materials are undesirable, but unavoidable; the milling tools are not guaranteed to reach every part of the surfaces. Thus, it is extremely challenging to generate reliable design for manufacturability of a part to be machined.

SUMMARY OF THE DISCLOSURE

In an aspect a method of generating an instant design for manufacturability of a part at a computing device includes receiving a representative part model, wherein the representative part model comprises a plurality of sides. The method includes generating, at a graphics processing unit, a depth buffer model of the representative part model, wherein the depth buffer model of the representative part model further comprises a depth buffer for each side of the plurality of sides of the representative part model. The method includes determining, at an assignment module operating on the graphics processing unit, each orientation of the plurality of orientations of the representative part model as a function of each depth buffer of the plurality of depth buffers. The method further comprises generating, at a simulation module operating on the graphics processing unit, a prospective part as a function of at least a compatible part element, wherein generating a prospective part further comprises generating a simulated casing of the representative part model, wherein generating further comprises generating a simulated view for each side of the plurality of sides of the representative part model, superimposing each simulated view of the plurality of simulated views of the representative part model over each other and the representative part model, wherein the superposition creates the simulated casing, and filling at least a void space of the simulated casing of the representative part model. The method includes displaying the prospective part to a user device.

In another aspect a system for generating an instant design for manufacturability of a part includes a computing device designed and configured to receive a representative part model, wherein the representative part model comprises a plurality of sides. The computing device is further configured to generate, at a graphics processing unit, a depth buffer model of the representative part model, wherein the depth buffer model of the representative part model further comprises a depth buffer for each side of the plurality of sides of the representative part model. The computing device is further configured to determine, at an assignment module operating on the graphics processing unit, each orientation of the plurality of orientations of the representative part model as a function of each depth buffer of the plurality of depth buffers. The computing device is further configured to generate, at a simulation module operating on the graphics processing unit, a prospective part, wherein generating a prospective part further comprises generating a simulated casing of the representative part model, wherein generating further comprises generating a simulated view for each side of the plurality of sides of the representative part model, superimposing each simulated view of the plurality of simulated views of the representative part model over each other and the representative part model, wherein the superposition creates the simulated casing. The computing device is further designed and configured to display the prospective part to a user device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
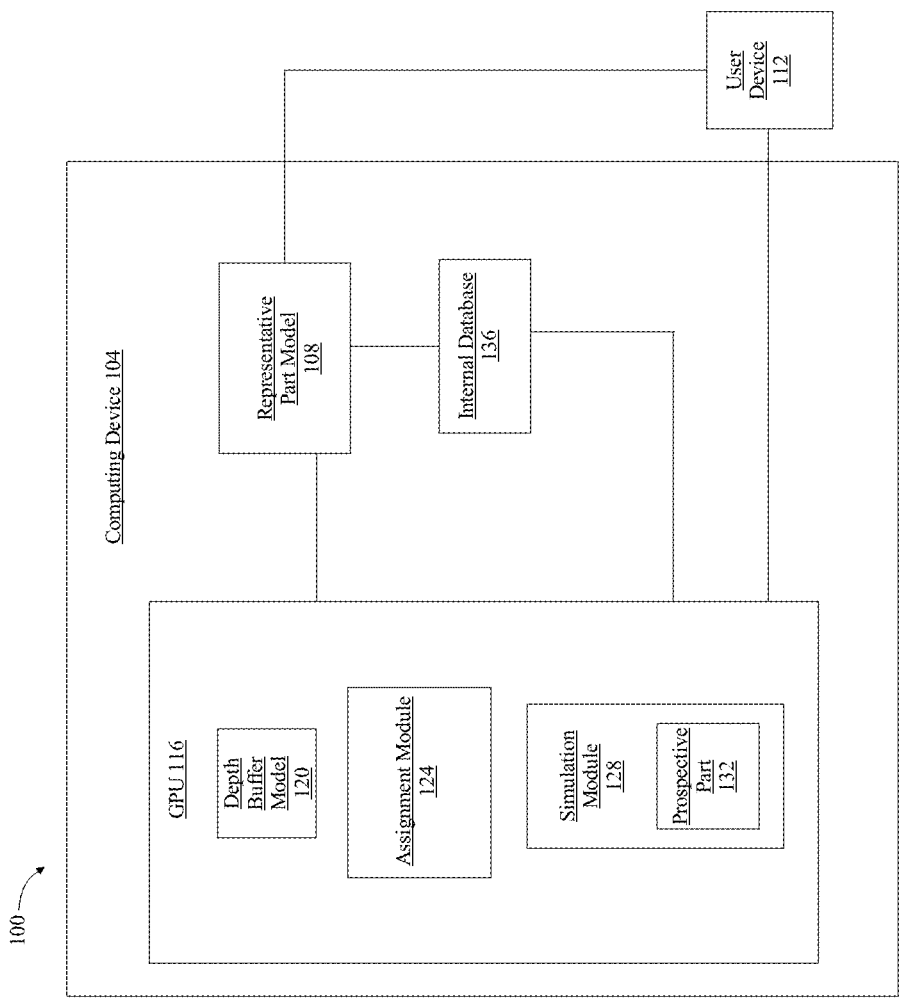
FIG. 1 is a high-level block diagram illustrating an embodiment of a system for generating an instant design for manufacturability of a part at a computing device.

The drawings are not necessarily to scale and may be illustrated by phantom lines, diagrammatic representations and fragmentary views. In certain instances, details that are not necessary for an understanding of the embodiments or that render other details difficult to perceive may have been omitted.

At a high level, aspects of the present disclosure are directed to systems and methods for generating an instant design for manufacturability of a part at a computing device. Embodiments of the systems and methods herein describe a means for generating an instant design for manufacturability of a part at a computing device by a novel process which generates, at a simulation module, a prospective part as a function of relating the representative part model to at least a part element and displays the prospective part to a user device. In an embodiment, the prospective part is determined by receiving a representative part model, which further comprises a plurality of surfaces, generating a depth buffer model of the representative part model, which further comprises a depth buffer for each surface of the plurality of surfaces of the representative part model, determining each orientation of the plurality of orientations of the representative part model as a function of each depth buffer of the plurality of depth buffers which further comprises identifying at least an unreachable zone of the representative part model, and generating a prospective part, which further comprises generating a simulated casing of the representative part model and filling a void space of the simulated casing of the representative part model.

Embodiments of the present system and method include a prospective part, wherein the prospective part may be produced utilizing a manufacturing process. In some embodiments, a manufacturing process is a process used to form a part, which may be an end-product, or a part used to assemble an end-product, by the performance of one or more manufacturing steps. As used herein, a representative part model and the prospective part are computer models that have the ability become a part when the one or more manufacturing steps been performed. One or more steps in the production of a part may include physical modifications to a representative part model or programming and modeling steps used to perform the modifications, such as modeling the representative part model or prospective part, or computing toolpaths or other algorithms for the part's manufacture.

One or more steps may include an additive manufacturing process, in which material is deposited to generate the prospective part. Additive manufacturing processes may further be used to generate the representative part model. In some embodiments, an additive manufacturing process is a process in which material is added incrementally to a body of material in a series of two or more successive steps. The material may be added in the form of a stack of incremental layers; each layer may represent a cross-section of the object to be formed upon completion of the additive manufacturing process. Each cross-section may, as a non-limiting example be modeled on a computing device as a cross-section of graphical representation of the object to be formed; for instance, a computer aided design (CAD) tool may be used to receive or generate a three-dimensional model of the object to be formed, and a computerized process may derive from that model a series of cross-sectional layers that, when deposited during the additive manufacturing process, together will form the object. The steps performed by an additive manufacturing system to deposit each layer may be guided by a computer aided manufacturing (CAM) tool. In other embodiments, a series of layers are deposited in a substantially radial form, for instance by adding a succession of coatings to the workpiece. Similarly, the material may be added in volumetric increments other than layers, such as by depositing physical voxels in rectilinear or other forms. Additive manufacturing, as used in this disclosure, may specifically include manufacturing done at the atomic and nano level. Additive manufacturing also includes bodies of material that are a hybrid of other types of manufacturing processes, e.g., forging and additive manufacturing as described above. As an example, a forged body of material may have welded material deposited upon it which then comprises an additive manufactured body of material.

Deposition of material in additive manufacturing process may be accomplished by any suitable means. Deposition may be accomplished using stereolithography, in which successive layers of polymer material are deposited and then caused to bind with previous layers using a curing process such as curing using ultraviolet light. Additive manufacturing processes may include "three-dimensional printing" processes that deposit successive layers of power and binder; the powder may include polymer or ceramic powder, and the binder may cause the powder to adhere, fuse, or otherwise join into a layer of material making up the body of material or product. Additive manufacturing may include metal three-dimensional printing techniques such as laser sintering including direct metal laser sintering (DMLS) or laser powder-bed fusion. Likewise, additive manufacturing may be accomplished by immersion in a solution that deposits layers of material on the body of material, by depositing and sintering materials having melting points such as metals, such as selective laser sintering, by applying fluid or paste-like materials in strips or sheets and then curing that material either by cooling, ultraviolet curing, and the like, any combination of the above methods, or any additional methods that involve depositing successive layers or other increments of material. Methods of additive manufacturing may include without limitation vat polymerization, material jetting, binder jetting, material extrusion, fuse deposition modeling, powder bed fusion, sheet lamination, and directed energy deposition. Methods of additive manufacturing may include adding material in increments of individual atoms, molecules, or other particles. An additive manufacturing process may use a single method of additive manufacturing or combine two or more methods. Companies producing additive manufacturing equipment include 3D Systems, Stratasys, formLabs, Carbon3D, Solidscape, voxeljet, ExOne, envisiontec, SLM Solutions, Arcam, EOS, Concept Laser, Renishaw, XJET, HP, Desktop Metal, Trumpf, Mcor, Optomec, Sciaky, and MarkForged, amongst others.

Additive manufacturing may include deposition of initial layers on a substrate. Substrate may include, without limitation, a support surface of an additive manufacturing device, or a removable item placed thereon. Substrate may include a base plate, which may be constructed of any suitable material; in some embodiments, where metal additive manufacturing is used, base plate may be constructed of metal, such as titanium. Base plate may be removable. One or more support features may also be used to support additively manufactured body of material during additive manufacture; for instance and without limitation, where a downward-facing surface of additively manufactured body of material is constructed having less than a threshold angle of steepness, support structures may be necessary to support the downward-facing surface; threshold angle may be, for instance 45 degrees. Support structures may be additively constructed and may be supported on support surface and/or on upward-facing surfaces of additively manufactured body of material. Support structures may have any suitable form, including struts, buttresses, mesh, honeycomb or the like; persons skilled in the art, upon reviewing the entirety of this disclosure, will be aware of various forms that support structures may take consistently with the described methods and systems.

Examples of additively manufactured bodies of material from which plurality of discrete objects can be made include, but are not limited to, plates, slabs, blooms, billets, boards, blocks, among many other shapes, including curvilinear and multisided shapes, and any combination thereof, as set forth in further detail below. As for material(s) composing an additively manufactured body of material, the material(s) may be any suitable material(s), such as metal (solid, sintered, etc.), polymer (solid, foamed, etc.), composite, and multilayer material, among others. Fundamentally, there is no limitation on the composition of an additively manufactured body of material. An additively manufactured body of material may include at least one reference datum designed, configured, and located for precisely locating a stabilized workpiece relative to a subtractive manufacturing device, as described in further detail below. In an embodiment, and as described in further detail below, an additively manufactured body of material represents a "near net" discrete object that may share some geometric characteristics with a discrete object; for instance, an additively manufactured body of material may visually resemble a discrete object but lack threading, forming to a given tolerance, or one or more features more readily formed by subtractive manufacturing, for example. Additively manufactured body of material may be composed of a plurality of different materials.

A subtractive manufacturing process may be any suitable subtractive manufacturing process, such as, but not limited to, rotary-tool milling, electronic discharge machining, ablation, etching, erosion, cutting, and cleaving, among others. Fundamentally, there is no limitation on the type of subtractive manufacturing process(es) that may be used. In an example, differing subtractive manufacturing processes may be used before at different stages or to perform different steps of the subtractive manufacturing process as described below.

If rotary-tool milling is utilized, this milling may be accomplished using any suitable type of milling equipment, such as milling equipment having either a vertically or horizontally oriented spindle shaft. Examples of milling equipment include bed mills, turret mills, C-frame mills, floor mills, gantry mills, knee mills, and ram-type mills, among others. In an embodiment, milling equipment used for removing material may be of the computerized numerical control (CNC) type that is automated and operates by precisely programmed commands that control movement of one or more parts of the equipment to affect the material removal. CNC machines, their operation, programming, and relation to CAM tools and CAD tools are well known and need not be described in detail herein for those skilled in the art to understand the scope of the present invention and how to practice it in any of its widely varying forms.

Subtractive manufacturing may be performed using spark-erosive devices; for instance, subtractive manufacturing may include removal of material using electronic discharge machining (EDM). EDM may include wire EDM, plunge EDM, immersive EDM, ram EDM, or any other EDM manufacturing technique. Subtractive manufacturing may be performed using laser-cutting processes. Subtractive manufacturing may be performed using water-jet or other fluid-jet cutting techniques. Fundamentally, any process for removal of material may be employed for subtractive manufacturing.

Referring now to FIG. 1, a block diagram of system 100 for generating an instant design for manufacturability of a part. System 100 is configured to generate a prospective part as a function of relating the representative part model to at least a part element and display the prospective part to a user device. System 100 includes a computing device 104. Computing device 104 may include any computing device as described in this disclosure, including without limitation, a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

Computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to refer to FIG. 1, system 100 is configured to receive a representative part model 108 from a user device 112. Representative part model 108 further includes a plurality of sides. A "representative part," as used in this disclosure, is a computer model of a part to be manufactured, wherein manufacturing may include any manufacturing process as described in the entirety of this disclosure. Representative part model 108 may further include any data describing and/or relating to a computer model of a part to be manufactured. A computer model, as described herein, is a digital model of a physical structure as created using computer-aided design (CAD) modeling software. For example and without limitation, computer-aided design (CAD) software may include SOLIDWORKS® software and/or CATIA software (available from Dassault Systèmes SolidWorks Corp, Waltham, Massachusetts), AUTOCAD® software and/or Fusion 360 software (available from Autodesk, Inc., San Rafael, California), PTC Creo software (available from PTC, Inc., Boston, Massachusetts), Siemens NX software (available from Siemens PLM Software, Plano, Texas) and MICROSTATION® software (available from Bentley Systems, Inc., Exton, Pennsylvania), and the like. The computer model may include any modeling type, such as, without limitation, a wireframe, solid model and/or any combination thereof. The computer model may be saved in a computer file using any suitable file protocol, such as, without limitation, SolidWorks part file (.SLDPRT), several SolidWorks part files organized into a single assembly (.SLDASM), 3D assembly file supported by various mechanical design programs (.STP), graphics file saved in a 2D/3D vector format based on the Initial Graphics Exchange Specification (.IGS) and/or the like. The computer model further includes information about the geometry and/or other defining properties of the mechanical part's structure. The computer model may include a polygon mesh, such as a collection of vertices, edges, and faces, that define the shape of representative part model 108. For example and without limitation, the faces of the polygon mesh may include triangles, such as a triangle mesh, quadrilaterals, or other simple convex polygons.

Still referring to FIG. 1, representative part model 108 includes a plurality of sides. Each side of the plurality of sides, as used in this disclosure, is a view of representative part model 108 from a plane orthogonal to an axis passing through an origin of representative part model 108. The axis may include, as a non-limiting example, a three-axis coordinate system, such as the x-axis, y-axis, and z-axis, or abscissa, ordinate, and applicate. The axis may include, as a further non-limiting example, any axis as a function of the origin. Persons skilled in the art, upon reviewing the entirety of this disclosure, will be aware of axis which may be suitable for use as each side of the plurality of sides consistently with this disclosure. The origin of the representative part model, as described herein, is a fixed point of reference for the representative part model 108. For example and without limitation, the origin may include the center of mass, the geometric center, the center of a feature of the part, wherein a feature may be a hole, a well, a groove, a pocket, a channel, extruded volume, and the like. As a further example and without limitation, the origin may include any position of the representative part model.

Continuing to refer to FIG. 1, representative part model 108 may further include semantic information of the part to be manufactured. "Semantic information", as described in this disclosure, is data concerning and/or describing product and manufacturing information (PMI) and product life cycle management (PLM). PMI, as used in this disclosure, is data describing non-geometric attributes of the computer model of representative part model 108 necessary for manufacturing the part, components of the part, and associated assemblies. For example and without limitation, PMI may include geometric dimensions and tolerances, 3D annotation and dimensions, surface finish, material specifications, and the like. PMI may include textual data, such as alphanumeric, punctuation, typographical symbols, character, string data, and/or any textual data as described in the entirety of this disclosure. PLM, as used in this disclosure, is any data concerning and/or describing management of the lifecycle of the part from inception, through engineering design and manufacture, to service and disposal of the manufactured part. PLM may include textual data, such as alphanumeric, punctuation, typographical symbols, character, string data, and/or any textual data as described in the entirety of this disclosure. In an embodiment, semantic information included in representative part model 108 may be used in processes for pricing a part to be manufactured.

With continued reference to FIG. 1, a user device 112 may include, without limitation, a transmission of communication with at least a server 104; transmission may include any transmission as described herein. A user device 112 may include an additional computing device, such as a mobile device, laptop, desktop computer, or the like; as a non-limiting example, the user device 112 may be a computer and/or workstation operated by an engineering professional. Persons skilled in the art, upon reviewing the entirety of this disclosure, will be aware of various devices which may be suitable for use as user device consistently with this disclosure.

Still referring to FIG. 1, system 100 is further configured to include graphics processing unit (GPU) 116 operating on computing device 104. A "GPU 116", as used in this disclosure, is a device with a set of specific hardware capabilities that are intended to map well to the way that various 3D engines execute their code, including geometry setup and execution, texture mapping, memory access, and/or shaders. GPU 116 may be a processor, wherein a processor may include any processor as described in the entirety of this disclosure. GPU 116 may include, without limitation, a specialized electronic circuit designed to rapidly manipulate and alter memory to accelerate the creation of images in a frame buffer. For instance, and without limitation, GPU 116 may include a computer chip that performs rapid mathematical calculations, primarily for the purpose of rendering images. GPU 116 may further include, without limitation, full scene anti-aliasing (FSAA) to smooth the edges of 3-D objects and anisotropic filtering (AF) to make images look crisper. GPU 116 may include, without limitation, dedicated graphics cards, integrated graphics cards, hybrid graphics cards, and/or any combination thereof.

With continued reference to FIG. 1, GPU 116 may be configured to generate a depth buffer model 120 of representative part model 108. Depth buffer model 120 of representative part model 108 further includes a depth buffer for each side of the plurality of sides of representative part model 108. The "depth buffer", as used in this disclosure, is a 2-dimensional image of representative part model 108 wherein each pixel, dexel, or multi-dixel carries the depth or the depths. The depth buffer may be generated by a process of rasterization, wherein the depth represents the traveling distance of where a ray hits the surface of the side of representative part model 108. Rays are shot from a side of representative part model 108 in the perpendicular direction. The depth buffer for each side of the plurality of sides is defined for only the visible area of each side of representative part model 108, wherein all surfaces of the part to be machined need to be visible from one of the sides in order to machine the part. GPU 116 may be further configured to generate a depth buffer for each side of the plurality of sides of representative part model 108. GPU 116 may further be configured to superimpose the depth buffer for each side of the plurality of sides of representative part model 108, wherein superimposing each depth buffer of the plurality of depth buffers creates depth buffer model 120. The "depth buffer model 120", as used in this disclosure, is the aggregate of each depth buffer of the plurality of depth buffers wherein the depth buffer model displays a 3-dimensional image of representative part model 108 as a function of the depth. Each depth buffer of the plurality of depth buffers defines a partial surface of representative part model 108 and depth buffer model 120 constitutes the complete definition of representative part model 108. Persons skilled in the art, upon reviewing the entirety of this disclosure, will be aware of various depth buffers which may be suitable for use in a depth buffer model consistently with this disclosure.

Continuing to refer to FIG. 1, system 100 may include assignment module 124 operating on GPU 116. Assignment module 124 may include any hardware and/or software module. Assignment module 124 is configured to determine at least an orientation of representative part model 108 as a function of each depth buffer of the plurality of depth buffers. Orientation, as described herein, is a plane parallel to the direction of machining the part, wherein the plane may be positioned on any direction. The direction, as described herein, may include any axis as described in the entirety of this disclosure. The axis may include, as a non-limiting example, a three-axis coordinate system, such as the x-axis, y-axis, and z-axis, or abscissa, ordinate, and applicate. As a further non-limiting example, the axis may include a five-axis system, such as two rotation axis, x-axis, y-axis, and z-axis. The axis may include, as a further non-limiting example, any rotational axis as a function of the origin. In order to machine the entirety of the part, the at least an orientation needs to include planes to ensure all features of representative part model 108 are machined wherein features include any feature as described in the entirety of this disclosure. For example and without limitation, a cylindrical part may be machined in its entirety from the at least an orientation consisting of planes perpendicular to the rotational axis of the cylinder. As a further non-limiting example, a cylindrical part with a hole in one side may be machined in its entirety from the at least an orientation consisting on planes on perpendicular to the rotational axis of the cylinder and the radial axis. Persons skilled in the art, upon reviewing the entirety of this disclosure, will be aware of various planes which may be suitable for use the at least an orientation consistently with this disclosure.

With continued reference to FIG. 1, determining each orientation of the plurality of orientations may further include identifying at least an unreachable zone of depth buffer model 120. At least an "unreachable zone", as used in this disclosure, is a feature of a part which needs to be machined in the at least an orientation. Identifying the at least an unreachable zone of depth buffer model 120 may include running digital filters on each depth buffer of the plurality of depth buffers of each side of representative part model 108. In an embodiment, the feature of a part which needs to be machined in the at least an orientation, may include a feature of a part which needs to be molded in the at least an orientation. A "digital filter", as described herein, is a system that performs mathematical operations on the depth buffer. For example without limitation, digital filter my include convolution filter, Wavelet transform, and Fast Fourier transform (FFT). For example and without limitation, identifying the at least an unreachable zone of depth buffer model 120 may include applying a digital filter to the at least an orientation of the planes of −z-axis and +z-axis and subtracting the at least an orientation of the planes including the digital filters from the at least an orientation of the plane including the feature of the part to be machined. As a further example without limitation, identifying the at least an unreachable zone of depth buffer model 120 may include applying a digital filter to the at least an orientation of the plane including the feature of the part to be machined and subtracting the at least an orientation of the planes including the digital filters from the at least an orientation of the plane including the feature of the part to be machined. Identifying the at least an unreachable zone of depth buffer model 120 is performed for each feature of the plurality of features of representative part model 108.

Continuing to refer to FIG. 1, determining each orientation of the plurality of orientations may further include generating a geodesic representative part model, wherein the geodesic representative part model includes the representative part model encased in a geodesic polygon. The "geodesic sphere", as described herein, is a computer model of a sphere, wherein the sphere is comprised of triangular elements. For example and without limitation, the triangular elements of the geodesic sphere may include any frequency of triangles. Further the triangular elements may be arranged in orientation, as a non-limiting example, the orientations may include a platonic solid, such as a tetrahedron, hexahedron, octahedron, dodecahedron, and an icosahedron. The representative part model may be encased in the geodesic sphere forming the geodesic representative part model. The representative part model may be oriented inside the geodesic sphere such that the entirety of the representative part model is within the geodesic sphere. As an example and without limitation, the representative part model may be oriented such that the origin of the representative part model is aligned with the origin of the geodesic sphere. Persons skilled in the art, upon reviewing the entirety of this disclosure, will be aware of various models which may be suitable for use the geodesic representative part model consistently with this disclosure.

With continued reference to FIG. 1, determining each orientation of the plurality of orientations may further include computing a thickness direction datum of the geodesic representative part model. The "thickness direction datum", as described herein, is the minimum distance between two parallel planes which enclose the representative part model within the geodesic representative part model in a given direction. Further, determining each orientation of the plurality of orientations may further include computing an accessibility cone represented by the geodesic sphere. The "accessibility cone", as described herein, is the tool reachable orientation from the location of the part. The geodesic sphere may include, for example and without limitation, any geodesic sphere as described in the entirety of this disclosure. For example and without limitation, the direction may include any axis as described in the entirety of this disclosure, such as an x-axis, y-axis, z-axis, and/or any rotational axis. As an example and without limitation, in 3-axis milling the z-axis may be assigned to compute the thickness direction datum. As a further example and without limitation, in 5-axis milling a rotational axis may be assigned to the direction in the accessibility cone. In an embodiment and without limitation, in 5-axis milling any axis may be assigned to the direction in the accessibility cone. In an embodiment, computing the accessibility cone includes performing ray tracing, such as reverse order ray tracing, wherein rays of light are traced from the surface of the part in the direction of the geodesic sphere. In the embodiment, ray tracing further includes determining visibility directions, wherein the visibility direction is a ray of light that does not contact the surface of the part. Ray tracing may include any methodology of ray tracing as described in further Further, in the embodiment, ray tracing further includes conducting a tool reachability test on the GPU as a function of the visibility directions. For example and without limitation, the tool reachability test may include a collision test, gouge test, and the like. In an embodiment and without limitation, the visibility cone may be narrowed by taking into account the tool holder collision against the workpiece. In the embodiment, the milling orientation is configured to be selected from the visibility cone. The visibility cone may include any visibility information as described in the entirety of this disclosure. In an embodiment and without limitation, any visibility information as described in the entirety of this disclosure, can be stored in the geodesic sphere and/or in the rasterized depth image of the representative part. In an embodiment, determining each orientation of the plurality of orientations may include computing a bitonic sorting algorithm. The bitonic sorting algorithm, as described herein, is a parallel sorting algorithm that performs $O(\log^2(n))$ comparisons. For example and without limitation, the bitonic sorting algorithm utilizes the thickness direction datum and a dominant surface normal. The dominant surface normal, as described herein, is the largest surface normal direction of each direction of the part. As an example and without limitation, the dominant surface normal is the z-axis when the z-height increase remains under 2× and the surface area is larger than the 20% of the XY plane projected area of the representative part model. Persons skilled in the art, upon reviewing the entirety of this disclosure, will be aware of various distances which may be suitable for use as the thickness direction datum consistently with this disclosure.

Still referring to FIG. 1, system 100 may include simulation module 128 operating on GPU 116. Simulation module 128 may include any hardware and/or software module. Simulation module 128 is configured to generate prospective part 132. A "prospective part 132", as used in this disclosure, is a computer model of representative part model 108 that has been optimized for manufacturing, wherein optimization is the design of representative part model 108 that has the lowest manufacturing costs. In an embodiment, simulation module 128 may utilize digital filters, as described herein, to perform the tool offset and the tool back offset operations, wherein the digital filter computes a new depth for each pixel as a function of the neighboring pixels. Tool offset is defined as the offset distance and tool back offset is defined as the material removal computation. Tool offset operates by exhausting all possible tool paths for the given tool, and tool back offset operates by simulating the machined surface for the tool offset and which gives the least amount of the left-over materials for the given tool. Digital filters may be applied to each side of the plurality of sides of representative part model 108 wherein each filter is representative of a different milling tool. For example and without limitation, milling tools may include diameters of ¼", ⅛", 1/16", 1/32", and the like. As the diameter of the milling tool increases, the amount of tool offset distance increases. In an embodiment, generating prospective part 132 is generated a function of instrument reachability. Instrument reachability, as described herein, is a digital filter, wherein tool reachability due to shank and tool holder collision are implemented. Shank collision, as described herein, occurs when the tool collides with the workpiece. For example and without limitation, the tool may collide with a top face, bottom face, machined face, unmachined face, and/or any other face of the workpiece. Tool holder collision, as described herein, occurs when the tool holder collides with workpiece. For example and without limitation, the tool holder may collide with a top face, bottom face, machined face, unmachined face, and/or any other face of the workpiece. In an embodiment, instrument reachability may be performed utilizing ray tracing. "Ray tracing" as described herein, is a rendering technique for generating an image and/or computer model by tracing the path of light as pixels in an image plane and simulating the effects of its encounters with the representative part model. For example and without limitation, ray tracing can be performed in forward order, such that the visibility information is stored in the depth buffers, or rasterized depth images. As a further example and without limitation, ray tracing may be performed in reverse order, such that the visibility information is stored in the geodesic sphere. In the embodiment, instrument reachability may be computed utilizing a graphics processing unit, central processing unit, and the like. Persons skilled in the art, upon reviewing the entirety of this disclosure, will be aware of various digital filters which may be suitable for use as instrument reachability consistently with this disclosure.

With continued reference to FIG. 1, in an embodiment, generating prospective part 132 is further configured to include generating a simulated casing of representative part model 108, wherein generating a simulated casing further includes generating a simulated view for each side of the plurality of sides of the representative part model 108 and superimpose each simulated view of the plurality of simulated views of the representative part model 108 over the representative part model 108; simulated views may be superimposed over each other, for instance by iteratively modifying representative part model 108 and/or a copy thereof with each new superimposition. In an embodiment, superimposing views of representative part model 108 create simulated casing of the representative part model 108. A "simulated view", as used in this disclosure, is a side of the plurality of sides of representative part model 108, wherein the side has digital filters of one or more different milling tools applied. A "simulated casing", as used in this disclosure, is an aggregate of each simulated view of a plurality of simulated views of representative part model 108 wherein the simulated casing displays a super position of each machined surface of the plurality of machined surfaces of representative part model 108. Persons skilled in the art, upon reviewing the entirety of this disclosure, will be aware of various simulated views which may be suitable for use in in a simulated casing consistently with this disclosure.

Continuing to refer to FIG. 1, in an embodiment, generating prospective part 132 is further configured to fill at least a void space of the simulated casing of representative part model 108. The at least a void space, as defined herein, is the space defined by the by each simulated view of the plurality of simulated views of representative part model 108. In an embodiment, filling the void space of the simulated casing of representative part model 108 may further include removing the simulated casing of representative part model 108 from the filled void space of the simulated casing of representative part model 108. Removing the simulated casing of representative part model 108 from the filled void space of the simulated casing of representative part model 108 may include separating only the filled void space of the simulated casing of representative part model 108. For example and without limitation, removing the simulated casing of representative part model 108 may include erasing the simulated casing of representative model 108, wherein erasing the simulated casing leaves only the filled void space of representative part model 108 visible. In an embodiment, for example and without limitation, the filled void space of representative part model 108 may be used to generate instant design for manufacturability.

Continuing to refer to FIG. 1, system 100 may further include internal database 136. Internal database 128 may be implemented, without limitation, as a relational database, a key-value retrieval datastore such as a NOSQL database, or any other format or structure for use as a datastore that a person skilled in the art would recognize as suitable upon review of the entirety of this disclosure. Dataset may be stored in any suitable data and/or data type. For instance and without limitation, dataset may include textual data, such as numerical, character, and/or string data. Textual data may include a standardized name and/or code for in-process and/or post-processing manufacturing, or the like; codes may include raw material codes, dimensional codes, calibration codes, mechanical and/or thermal testing codes, safety codes, and/or data formatting codes, which may include without limitation codes used in CAD 3D geometry, assembly and PMI standards such as STEP AP242 and ASME Y14.5 geometric dimensioning and tolerancing (GD&T) symbols. In general, there is no limitation on forms textual data or non-textual data used as dataset may take; persons skilled in the art, upon reviewing the entirety of this disclosure, will be aware of various forms which may be suitable for use as dataset consistently with this disclosure.

Still referring to FIG. 1, dataset may be stores as image data, such as for example an image of a particular CNC mechanical part, such as a computer model of a threaded bolt, a computer-aided design of a stainless-steel endcap, or a tool path of a hollow box. Image data may be stored in various forms including for example, joint photographic experts group (JPEG), exchangeable image file format (Exif), tagged image file format (TIFF), graphics interchange format (GIF), portable network graphics (PNG), netpbm format, portable bitmap (PBM), portable any map (PNM), high efficiency image file format (HEIF), still picture interchange file format (SPIFF), better portable graphics (BPG), drawn filed, enhanced compression wavelet (ECW), flexible image transport system (FITS), free lossless image format (FLIF), graphics environment manage (GEM), portable arbitrary map (PAM), personal computer exchange (PCX), progressive graphics file (PGF), gerber formats, 2 dimensional vector formats, 3 dimensional vector formats, compound formats including both pixel and vector data such as encapsulated postscript (EPS), portable document format (PDF), SolidWorks part file (.SLDPRT), several SolidWorks part files organized into a single assembly (.SLDASM), 3D assembly file supported by various mechanical design programs (.STP), graphics file saved in a 2D/3D vector format based on the Initial Graphics Exchange Specification (.IGS) and stereo formats.

With continued reference to FIG. 1, in an embodiment, system 100 may be configured to display prospective part 132 to user device 112. Displaying may include any means of displaying as described in the entirety of this disclosure. Displaying prospective part 132 to user device 112 may further comprise verifying, by the user at user device 112, prospective part 132. Verifying may include, for example and without limitation, any means of confirmation, such as viewing prospective part 132 and selecting a button. Persons skilled in the art, upon reviewing the entirety of this disclosure, will be aware of various confirmations which may be suitable for use as verifying consistently with this disclosure.

Figure 2:
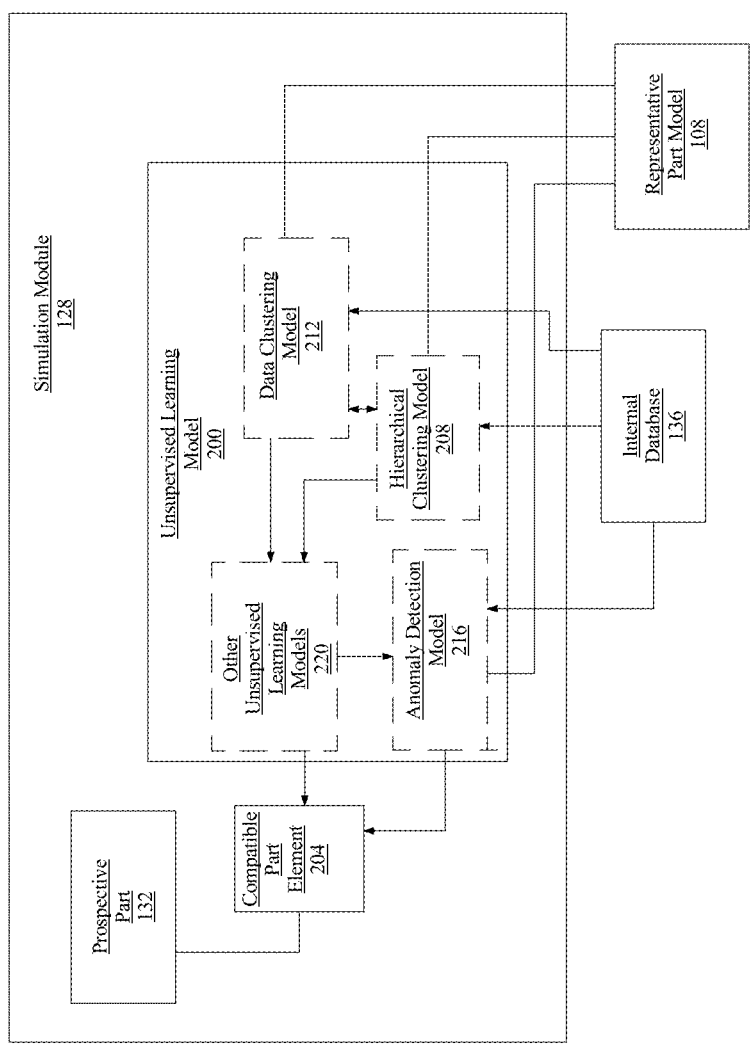
FIG. 2 illustrates a block diagram of an embodiment of a simulation module.

Referring now to FIG. 2, computing device 104 is configured to select at least a correlated dataset containing a plurality of data entries wherein each dataset contains at least a datum of manufactured part data and at least a first correlated compatible part element as a function of representative part model 108. Manufactured part data, as used herein, includes any descriptive attributes of the representative part model 108. Descriptive attributes, as used herein, are any features, limitations, details, restrictions and/or specifications of the manufacturing request datum 108. Descriptive attributes may include, without limitation, any features, limitations, details, restrictions and/or specifications relating to the part geometry, materials, finishes, connections, hardware, special processes, dimensions, tolerances, and the like. Descriptive attributes may further include, without limitation, any features, limitations, details, restrictions, and/or specifications relating to the total request for manufacture, such as total amount of manufactured parts, restrictions on deadline to have request completed, and the like. As an example and without limitation, manufactured part data may include part count data that contains the total number of each part included in the representative part model 108, such as a request to have a total number of 24 brackets manufactured. As a further example and without limitation, manufactured part data may include part face count data that contains the total number of faces on the part included in the representative part model 108, such as a price request to have a hollow box with a total of 10 faces manufactured. As another example and without limitation, manufactured part data may include part material data that contains the material to which the user desired to have the part of the representative part model 108 manufactured, such as a quote request for a titanium roller bushing. Persons skilled in the art, upon reviewing the entirety of this disclosure, will be aware of various descriptive attributes which may be suitable for use as manufactured part data consistently with this disclosure. Datasets may be selected and contained within internal database 136 as described below in more detail in reference to FIG. 3.

With continued reference to FIG. 2, each dataset contains at least a datum of manufactured part data and at least a first correlated compatible part element. A "correlated compatible part element", as used in this disclosure, is an element of data identifying and/or describing any characteristic of a part that may affect, modify and/or have an influence on the manufacturing process as a function of the representative part model 108. Characteristics of a part that may affect, modify and/or have an influence on the manufacturing process, as used herein, may include any detail of the representative part model 108 that may impact limitations of the manufacturing process, such as milling time, milling cost, tool path and/or tool selection. Correlated compatible part element may include for example a particular characteristic such as, one horizontal hole included in the mechanical part, three hollow openings included in the mechanical part, and 12 cooling fins included in the part. Characteristics may include a category of part characteristics that may be categorized as having a shared attribute or trait. For example and without limitation, characteristics may include categories such as including horizontal holes, including vertical holes, similar traits of manufacturing materials, such as fracture toughness, flexibility, conductivity, corrosion resistance, and the like, including gear features, including threading, diameter, length, design for manufacturability, volume, and the like. In an embodiment, at least a datum of manufactured part data is correlated with a compatible part element where the element of manufactured part data is located in the same data element and/or portion of data element as the manufactured part data. For example and without limitation, and element of manufactured part data is correlated with a compatible part element where both element of manufactured part data and compatible part element are contained within the same first dataset. For instance and without limitation, manufactured part data showing a request for a quantity of 10,000 parts may be correlated to a compatible part element such as a manufactured part machines by limited tool sets which is shown to improve scalability by decreasing the amount of times the machine would be required to change tools. In another example and without limitation, manufactured part data showing a desire for a cooling fin may be correlated to a compatible part element such as aluminum which is thermal conductor, absorbing heat quickly, and a common material for cooling fins because of this attribute. In yet another non-limiting example, manufactured part data showing a need to withstand a load above a certain threshold may be correlated to a compatible part element such as titanium which is recognized for its high strength-to-weight ratio.

Continuing to refer to FIG. 2, at least a dataset may be used as training data for machine-learning processes as described in this disclosure. "Training data," as used in this disclosure, is data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

With continued reference to FIG. 2, alternatively or additionally, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by computing device 104 may correlate any input data as described in this disclosure to any output data as described in this disclosure.

Continuing to refer to FIG. 2, computing device 104 may perform determinations, classification, and/or analysis steps, methods, processes, or the like as described in this disclosure using machine learning processes. A "machine learning process," as used in this disclosure, is a process that automatedly uses training data, which may also be referred to as a "training set," to generate an algorithm and/or model that will be performed by a computing device/module to produce outputs given data provided as inputs; this is in contrast to a non-machine learning software program where the commands to be executed are determined in advance by a user and written in a programming language.

Still referring to FIG. 2, simulation module 128 may include an unsupervised machine-learning module 200. Unsupervised machine-learning model 200 may operate on the computing device and/or another server in communication with the computing device 104, which may include any hardware and/or software module. The computing device 104 is configured to generate, at unsupervised machine-learning module 200 at least a compatible part element as a function of the representative part model and at least a part element. An unsupervised machine-learning process, as used herein, is a process that derives inferences in datasets without regard to labels; as a result, an unsupervised machine-learning process may be free to discover any structure, relationship, and/or correlation provided in the data. For instance, and without limitation, unsupervised machine learning module and/or computing device 104 may perform an unsupervised machine learning process on a first data set, which may cluster data of first data set according to detected relationships between elements of the first data set, including without limitation correlations of elements of manufactured part data to each other and correlations of compatible part elements to each other; such relations may then be combined with supervised machine learning results to add new criteria for at supervised machine-learning processes as described in more detail below. As a non-limiting, illustrative example, an unsupervised process may determine that a first manufactured part datum correlates closely with a second manufactured part data, where the first element has been linked via supervised learning processes to a given compatible part element, but the second has not; for instance, the second manufactured part data may not have been defined as an input for the supervised learning process, or may pertain to a domain outside of a domain limitation for the supervised learning process. Continuing the example, a close correlation between first manufactured part data and second manufactured part data may indicate that the second manufactured part data is also a good predictor for the compatible part element; second manufactured part data may be included in a new supervised process to derive a relationship or may be used as a synonym or proxy for the first manufactured part data.

With continued reference to FIG. 2, unsupervised machine-learning model 200 may include any method of cluster analysis which outputs a hierarchy of clusters. Cluster analysis, as used herein, includes any grouping of objects such as datasets in such a way that datasets in the same group or cluster are more similar to each other than to those in other clusters. Cluster analysis may include hard clustering and/or soft clustering. Hard clustering may include clustering where each dataset belongs to any particular cluster or not. Soft clustering may include clustering where each dataset may belong to a cluster to a certain degree such as a certain percentage of belonging to any given cluster or a likelihood of belonging to a given cluster. Hierarchical clustering may group and/or segment datasets with shared attributes to extrapolate algorithmic relationships. Unsupervised machine-learning model 200 may include generating various algorithms that may work to find clusters that may be generated based on parameter settings such as distance functions to use, density threshold, and optimal of clusters to generate. Unsupervised machine-learning model 200 may include models such as but not limited to connectivity models, centroid models, distribution models, density models, subspace models, group models, graph-based models, signed graph models, neural models, and the like.

Still referring to FIG. 2, unsupervised machine-learning model 200 may include agglomerative and/or divisive hierarchical clustering. Agglomerative hierarchical clustering may include a bottom-up approach whereby each observation may start in its own cluster, and pairs of clusters may be merged as one moves up the hierarchy. Divisive hierarchical clustering may include a top-down approach whereby all observations may start in one cluster and splits may be performed recursively moving down the hierarchy.

Continuing to refer to FIG. 2, unsupervised machine-learning model 200 includes any clustering unsupervised machine-learning model as described herein. In an embodiment, generating, at simulation module 128, prospective part 132 may be generated as a function of at least a correlated compatible part element. Unsupervised machine-learning model 200 generates at least a correlated compatible parts element 204. The at least a correlated compatible parts element 204 is generated as a function of the representative part model 108 and the correlated dataset. Correlated dataset may be selected from internal database 136 as described herein. Internal database 136 may contain data describing different characteristics of representative part model 108, such as geometric, volume, surface area, material, number of tools required, deadline to complete request, and the like, which may be organized into categories contained within internal database 136 as described above in more detail in reference to FIG. 3. Unsupervised machine-learning model may further include a hierarchical clustering model 208. Hierarchical clustering model 208 may group and/or segment datasets into hierarchy clusters including both agglomerative and divisive clusters. Agglomerative clusters may include a bottom up approach where each observation starts in its own cluster and pairs of clusters are merged as one moves up the hierarchy. Divisive clusters may include a top down approach where all observations may start in one cluster and splits are performed recursively as one moves down the hierarchy. In an embodiment, hierarchical clustering model 208 may analyze datasets obtained from internal database 136 to find observations which may each initially form own cluster. Hierarchical clustering model 208 may then then identify clusters that are closest together and merge the two most similar clusters and continue until all clusters are merged together. Hierarchical clustering model 208 may output a dendrogram which may describe the hierarchical relationship between the clusters. Distance between clusters that are created may be measured using a suitable metric. Distance may be measured between for example the two most similar parts of a cluster known as single linkage, the two least similar bits of a cluster known as complete-linkage, the center of the clusters known as average-linkage or by some other criterion which may be obtained based on input received from internal database 136, as an example.

With continued reference to FIG. 2, unsupervised machine-learning model 200 may perform other unsupervised machine learning models to output at least a compatible part element 204. Unsupervised machine-learning model 200 may include a data clustering model 408. Data clustering model 408 may group and/or segment datasets with shared attributes to extrapolate algorithmic relationships. Data clustering model 212 may group data that has been labelled, classified, and/or categorized. Data clustering model 212 may identify commonalities in data and react based on the presence or absence of such commonalities. For instance and without limitation, data clustering model 212 may identify other data sets that contain the same or similar characteristics of the part for manufacture contained within representative part model 108 or identify other datasets that contain parts with similar attributes and/or differentiations. In an embodiment, data clustering model 212 may cluster data and generate labels that may be utilized as training set data. Data clustering model 212 may utilize other forms of data clustering algorithms including for example, hierarchical clustering, k-means, mixture models, OPTICS algorithm, and DBSCAN.

With continued reference to FIG. 2, unsupervised machine-learning model 200 may include an anomaly detection model 216. Anomaly detection model 216 may be configured to identify rare items, events or observations that differ significant from the majority of the data. Anomaly detection model 216 may function to observe and find outliers. For instance and without limitation, anomaly detect may find and examine data outliers such as the side of representative part model 108 that is not compatible with any part elements or that is compatible with very few part elements. Anomaly detection model 216 may include any machine-learning model as described in the entirety of this disclosure. Further, anomaly detection model 216 may include any training data to train the anomaly detection model 216, as described in further detail in the entirety of this disclosure. In an embodiment, the training of anomaly detection model 216 allows the model to recognize patterns in order to determine what data is an outlier and what data is not, such as by determining a threshold and/or set of ranges.

Still referring to FIG. 2, unsupervised machine-learning model 200 may include other unsupervised machine-learning models 220. This may include for example, neural networks, autoencoders, deep belief nets, Hebbian learning, adversarial networks, self-organizing maps, expectation-maximization algorithm, method of moments, blind signal separation techniques, principal component analysis, independent component analysis, non-negative matrix factorization, singular value decomposition (not pictured).

Figure 3:
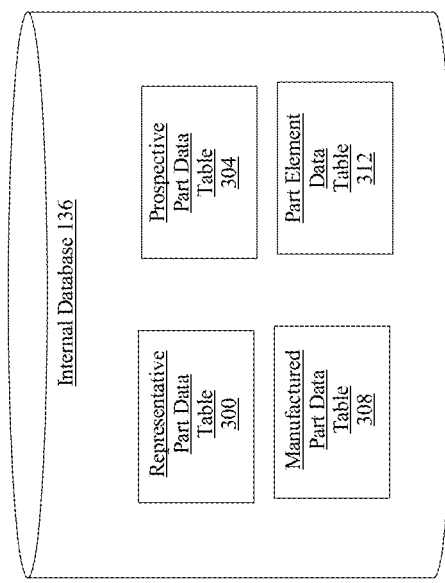
FIG. 3 is a block diagram illustrating an embodiment of an internal database.

Referring now to FIG. 3, an embodiment of internal database 136 is illustrated. Internal database 136 may be implemented as a hardware and/or software module. Internal database 136 may be implemented, without limitation, as a relational database, a key-value retrieval datastore such as a NOSQL database, or any other format or structure for use as a datastore that a person skilled in the art would recognize as suitable upon review of the entirety of this disclosure. Internal database 136 may contain datasets that may be utilized by unsupervised machine-learning model 200 to find trends, cohorts, and shared datasets between data contained within internal database 136 and representative part model 108. In an embodiment, datasets contained within internal database 136 may be categorized and/or organized according to shared characteristics. For instance and without limitation, one or more tables contained within internal database 136 may include representative part model data table 300, wherein representative part model data table 300 may include stored representative part model 108. As a further example and without limitation, one or more tables contained within internal database 136 may include prospective part data table 304, wherein prospective part data table 304 may include stored prospective part 132.

Still referring to FIG. 3, one or more tables contained within internal database 136 may include manufactured part data table 308. Manufactured part data table 308 may include datasets classified by the attributes of the part to be manufactured contained within representative part model 108. The manufactured part data table 308 may contain datasets describing material information, for example and without limitation, datasets describing metals, ASTM material standards, thermoplastics, thermosets, ceramics, graphite, biodegradable materials, medical and biochemical materials, nylons, acetals, polycarbonates, and the like. The manufactured part data table 308 may further contain datasets describing part count data, such as datasets describing total amount of parts for manufacture, for example and without limitation, by directly matching the numbers of parts for manufacture in representative part model 108, a range of numbers of parts for manufacture, a minimum and/or maximum threshold of numbers of parts for manufacture, and the like. The manufactured part data table 308 may further contain datasets describing face count data, such as describing the total amount of faces on the part for manufacture, for example and without limitation, by directly matching the number of faces on the part for manufacture contained within representative part model 108, a range of number of faces on the part for manufacture, a minimum and/or maximum threshold of faces on the part for manufacture, and the like. The manufactured part data table 308 may further contain datasets describing horizontal hole data, such as datasets describing the total number of horizontal holes contained in the part for manufacture, for example and without limitation, by directly matching the number of horizontal holes on the part for manufacture contained in representative part model 108, a range of numbers of horizontal holes in the part for manufacture, a minimum and/or maximum threshold of numbers of horizontal holes in the part for manufacture, and the like. The manufactured part data table 308 may further contain datasets describing vertical hole count data, such as datasets describing the total number of vertical holes contained in the part for manufacture, for example and without limitation, by directly matching the number of vertical holes on the part for manufacture contained in representative part model 108, a range of numbers of vertical holes in the part for manufacture, a minimum and/or maximum threshold of numbers of vertical holes in the part for manufacture, and the like. One or more tables contained within internal database 136 may include part element data table 308. Manufactured part data table 308 may include datasets classified by elements of the part of representative part model 108.

With continued reference to FIG. 3, one or more tables contained within internal database 136 may include part element data table 312. Part element data table 312 may contain datasets describing data classified by the ring shape configuration of the part for manufacture included in representative part model 108, wherein the data describes parts with ring shape configurations that were included in representative part model 108. The part element data table 312 may further contain datasets describing data classified by the cooling fin configuration of the part for manufacture included in representative part model 108, wherein the data describes parts with cooling fin configurations that were included in representative part model 108. Cooling fins, as described herein, are projections that increase the surface area from which heat can be radiated away from a device. The fins project outwards making the area for emitting heat internally smaller than the area emitting heat externally. The part element data table 312 may further contain datasets describing data classified by the heat sink configuration of the part for manufacture included in representative part model 108, wherein the data describes parts with heat sink configurations that were included in representative part model 108. Heat sinks, as described herein, are objects that absorbs and dissipates heat from another object using thermal contact. The part element data table 312 may further contain datasets describing data classified by the gear configuration of the part for manufacture included in representative part model 108, wherein the data describes parts with gear configurations that were included in representative part model 108. The part element data table 312 may further contain datasets describing data classified by the multiple hole configuration of the part for manufacture included in representative part model 108, wherein the data describes parts with multiple hole configurations that were included in representative part model 108. The part element data table 312 may further contain datasets describing data classified by the threaded configuration of the part for manufacture included in representative part model 108, wherein the data describes parts with threaded configurations that were included in representative part model 108. Threaded parts, as described herein, include parts containing a helical structure used to convert between rotational and linear movement or force.

Figure 4:
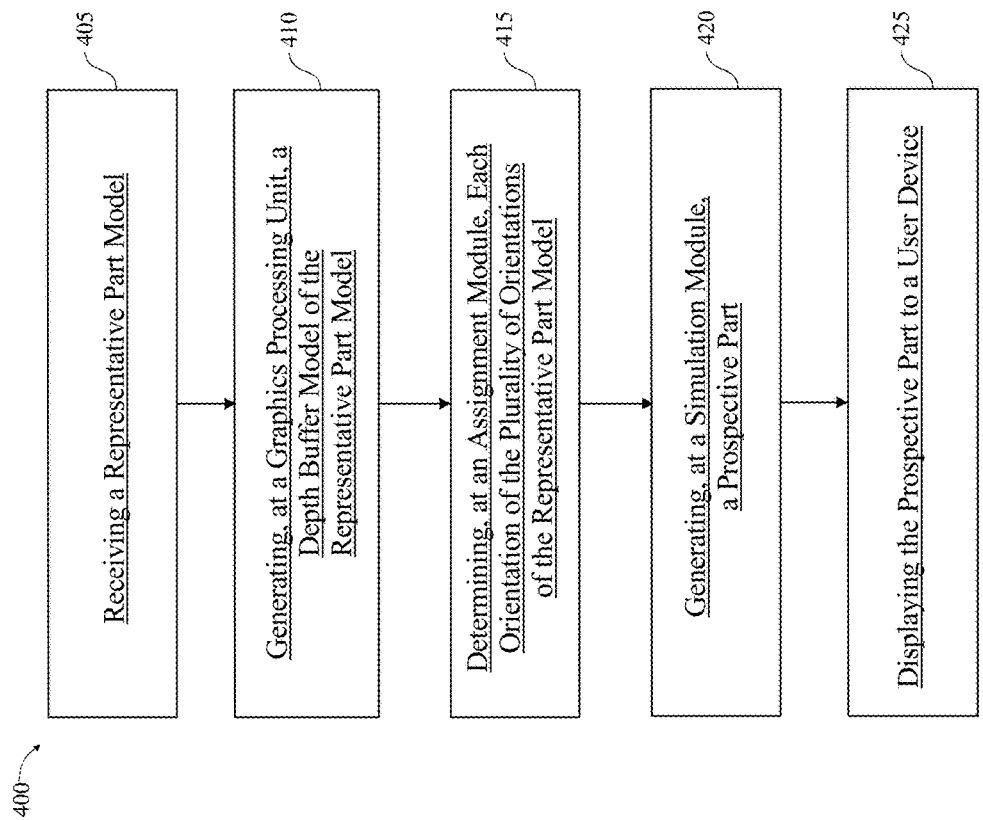
FIG. 4 is a process flow diagram illustrating an embodiment of a method for generating an instant design for manufacturability of a part at a computing device.
Figure 5A:
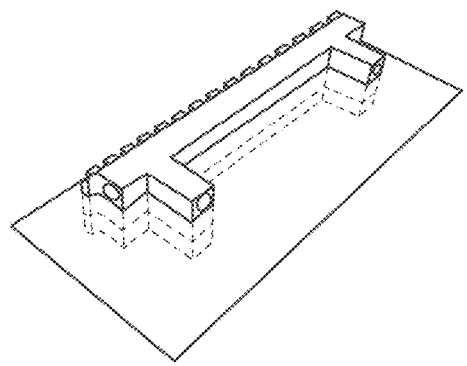
FIGS. 5A-F are computer renderings of an embodiment of the depth buffer for each side of the plurality of sides of the representative part model.
Figure 5B:
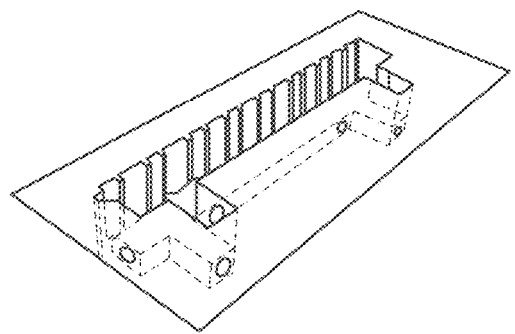
Figure 5C:
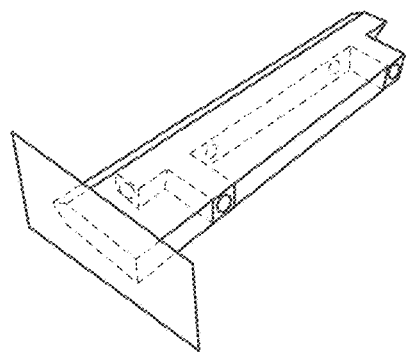
Figure 5D:
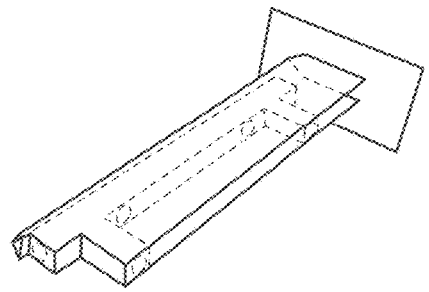
Figure 5E:
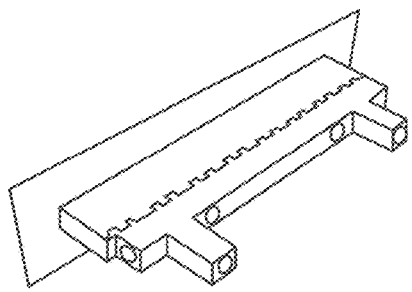
Figure 5F:
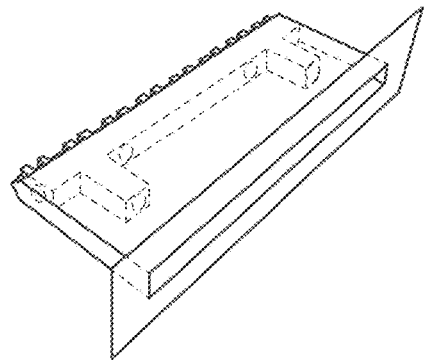
Figure 6A:
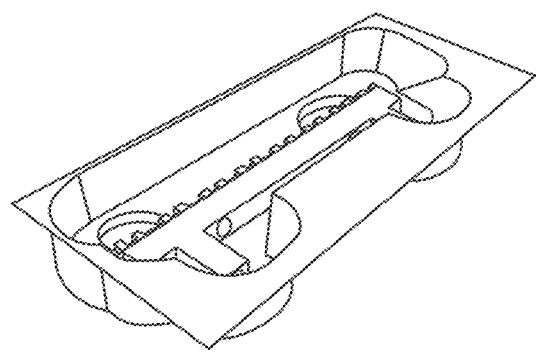
FIGS. 6A-F are computer renderings of an embodiment of each simulated view of the plurality of simulated views of the representative part model.
Figure 6B:
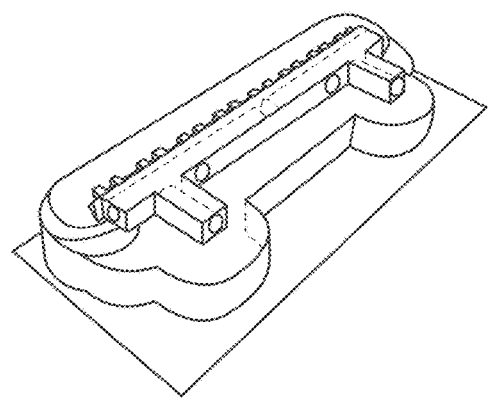
Figure 6C:
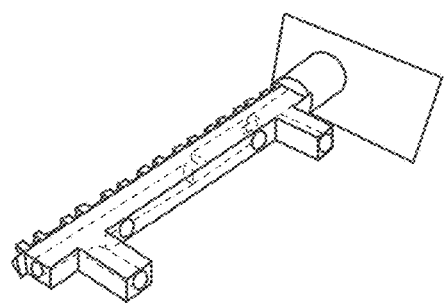
Figure 6D:
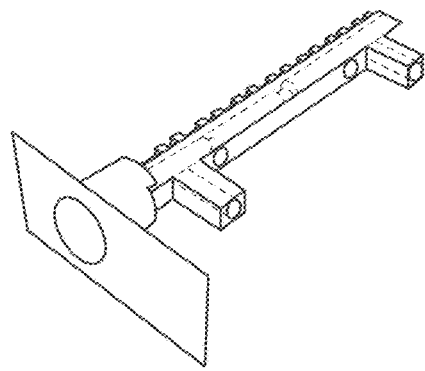
Figure 6E:
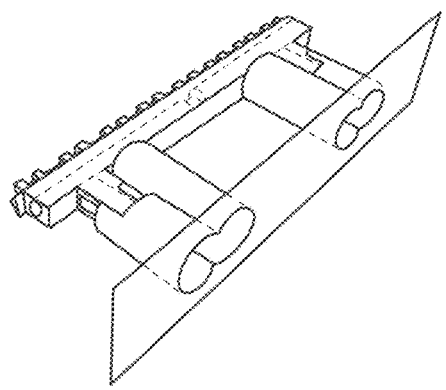
Figure 6F:
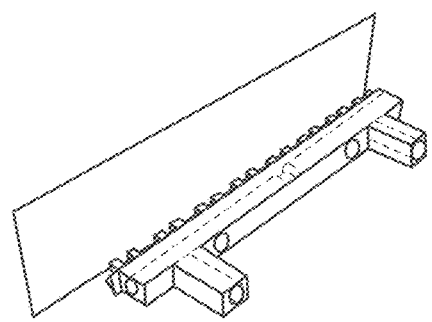

Referring now to FIG. 4, an embodiment of method 400 for generating an instant design for manufacturability of a part at computing device 104 is illustrated. At step 405, system 100 receives representative part model 108 from user device 112. Representative part model 108 further includes a plurality of sides. Representative part model 108 may be received by system 100 utilizing any of the network methodology as described herein. Representative part model 108 may include any representative part model 108 as described herein. Each side of the plurality of sides, as described herein, is the plane of each coordinate in axis passing through the origin of the representative part model. For example and without limitation, the axis may include a three-axis coordinate system, such as the x-axis, y-axis, and z-axis, or abscissa, ordinate, and applicate. As a further non-limiting example, the axis may include a five-axis system, such as two rotation axis, x-axis, y-axis, and z-axis. The axis may include, as a further non-limiting example, any rotational axis as a function of the origin, as described in further detail above in reference to FIG. 1. In an embodiment, representative part model 108 may further include semantic information. Semantic information may include any semantic information as described above in further detail in reference to FIG. 1.

Still referring to FIG. 4, at step 410, system 100 generates, at GPU 116, depth buffer model 120 of representative part model 108. Depth buffer model 120 may include any depth buffer model 120 as described herein. Depth buffer model 120 is the aggregate of each depth buffer of the plurality of depth buffers wherein the depth buffer model displays a 3-dimensional image of representative part model 108 as a function of the depth, as described above in reference to FIG. 1. GPU 116 may be further configured to generate a depth buffer for each side of the plurality of sides of representative part model 108. GPU 116 may further be configured to superimpose the depth buffer for each side of the plurality of sides of representative part model 108, wherein superimposing depth buffers of representative part model 108 will create depth buffer model 120, as described above in further detail in reference to FIG. 1. Depth buffer model 120 of representative part model 108 further includes a depth buffer for each side of the plurality of sides of representative part model 108. The depth buffer as described herein, is a 2-dimensional image of representative part model 108 wherein each pixel carries the depth. The depth buffer is generated by a process of rasterization, wherein the depth represents the traveling distance of where a ray hits the surface of the side of representative part model 108, as described above in further detail in reference to FIG. 1.

With continued reference to FIG. 4, at step 415, system 100 determines, at assignment module 124 operating on GPU 116, at least an orientation of representative part model 108 as a function of each depth buffer of the plurality of depth buffers. Assignment module 124 may include any hardware and/or software module, as described in this disclosure. Orientation, as described above in further detail in reference to FIG. 1, is a plane parallel to the direction of machining the part, wherein the plane may be positioned in any direction as described in the entirety of this disclosure. The direction, as described above in further detail in reference to FIG. 1, may include any axis as described in the entirety of this disclosure. The axis may include, as a non-limiting example, a three-axis coordinate system, a five-axis system, any rotational axis, and the like. For example and without limitation, a cylindrical part may be machined in its entirety from the at least an orientation consisting of planes on the −z-axis and the +z-axis, as described above in more detail in reference to FIG. 1. As a further non-limiting example, a cylindrical part with a hole in one side may be machined in its entirety from the at least an orientation consisting on planes on the −z-axis, +z-axis, and the −y-axis, as described above in more detail in reference to FIG. 1. Determining at least an orientation of representative part model 108 further includes identifying at least an unreachable zone of depth buffer model 120. The at least an unreachable zone is the feature of the part which needs to be machined in the at least an orientation, as described above in more detail in reference to FIG. 1. Identifying the at least an unreachable zone of depth buffer model 120 includes running digital filters on each depth buffer of the plurality of depth buffers of each side of representative part model 108, as described above in more detail in reference to FIG. 1. For example and without limitation, identifying the at least an unreachable zone of depth buffer model 120 may include applying a digital filter to the at least an orientation of the planes of −z-axis and +z-axis and subtracting the at least an orientation of the planes of −z-axis and +z-axis including the digital filters from the at least an orientation of the plane including the feature of the part to be machined, as described above in more detail in reference to FIG. 1. As a further example without limitation, identifying the at least an unreachable zone of depth buffer model 120 may include applying a convex filter to the at least an orientation of the plane including the feature of the part to be machined and subtracting the at least an orientation of the planes of −z-axis and +z-axis including the digital filters from the at least an orientation of the plane including the feature of the part to be machined, as described above in more detail in reference to FIG. 1.

Continuing to refer to FIG. 4, determining each orientation of the plurality of orientations may further include generating a geodesic representative part model, wherein the geodesic representative part model includes the representative part model encased in a geodesic polygon. The geodesic sphere may include any geodesic sphere as described above in further detail in reference to FIG. 1. For example and without limitation, the triangular elements of the geodesic sphere may include any frequency of triangles. Further the triangular elements may be arranged in orientation, as a non-limiting example, the orientations may include a platonic solid, such as a tetrahedron, hexahedron, octahedron, dodecahedron, and an icosahedron. The representative part model may be encased in the geodesic sphere forming the geodesic representative part model, as described above in further detail in reference to FIG. 1. The representative part model may be oriented inside the geodesic sphere such that the entirety of the representative part model is within the geodesic sphere, as described in further detail above. As an example and without limitation, the representative part model may be oriented such that the origin of the representative part model is aligned with the origin of the geodesic sphere. Persons skilled in the art, upon reviewing the entirety of this disclosure, will be aware of various models which may be suitable for use the geodesic representative part model consistently with this disclosure.

With continued reference to FIG. 4, determining each orientation of the plurality of orientations may further include computing a thickness direction datum of the geodesic representative part model. The thickness direction datum may include any thickness direction datum as described in further detail above in reference to FIG. 1. For example and without limitation, the direction may include any axis as described in the entirety of this disclosure, such as an x-axis, y-axis, z-axis, and/or any rotational axis. As an example and without limitation, in 3-axis milling the z-axis may be assigned to compute the thickness direction datum. In an embodiment, determining each orientation of the plurality of orientations may include computing a bitonic sorting algorithm. The bitonic sorting algorithm, as described above in further detail, is a parallel sorting algorithm that performs O(log 2(n)) comparisons. For example and without limitation, the bitonic sorting algorithm utilizes the thickness direction datum and a dominant surface normal. The dominant surface normal, as described above in further detail, is the largest surface normal direction of each direction of the part. As an example and without limitation, the dominant surface normal is the z-axis when the z-height increase remains under 2× and the surface area is larger than the 20% of the XY plane projected area of the representative part model. Persons skilled in the art, upon reviewing the entirety of this disclosure, will be aware of various distances which may be suitable for use as the thickness direction datum consistently with this disclosure.

Continuing to refer to FIG. 4, at step 420, system 100 generates, at simulation module 128, prospective part 132. Simulation module 128 may include any hardware and/or software module, as described in this disclosure. Prospective part 132, as described herein, is a computer model of representative part model 108 optimized for manufacturing, wherein optimization is the design of representative part model 108 that has the lowest manufacturing costs. In an embodiment, simulation module 128 utilizes digital filters, as described herein, to perform the tool offset and the tool back offset operations, wherein the digital filter computes a new depth for each pixel as a function of the neighboring pixels, as described in further detail above in reference to FIG. 1. Digital filter may include any digital filter as describe in the entirety of this disclosure. In an embodiment, generating prospective part 132 is generated a function of instrument reachability Instrument reachability, as described herein, is a digital filter, wherein tool reachability due to shank collision and tool holder collision is implemented. Shank collision, as described herein, occurs when the tool collides with the top face of the part, wherein the top face is the face being machined, as described in further detail above in reference to FIG. 1. Tool holder collision, as described above in further detail in reference to FIG. 1, occurs when the tool holder collides with workpiece. In an embodiment, instrument reachability may be performed utilizing ray tracing, as described above in further detail in reference to FIG. 1. Ray tracing, as described above in further detail, is a rendering technique for generating an image and/or computer model by tracing the path of light as pixels in an image plane and simulating the effects of its encounters with the representative part model. For example and without limitation, ray tracing can be performed in forward order, such that the visibility information is stored in the depth buffers, or rasterized depth images. As a further example and without limitation, ray tracing may be performed in reverse order, such that the visibility information is stored in the geodesic sphere. In the embodiment as described above, instrument reachability may be computed utilizing a graphics processing unit, central processing unit, and the like. Persons skilled in the art, upon reviewing the entirety of this disclosure, will be aware of various digital filters which may be suitable for use as instrument reachability consistently with this disclosure.

In an embodiment, generating prospective part 132 is further configured to include generating a simulated casing of representative part model 108, wherein generating a simulated casing further includes generating a simulated view for each side of the plurality of sides of the representative part model 108 and superimpose each simulated view of the plurality of simulated views of the representative part model 108 over each other and the representative part model 108, as described in further detail above in reference to FIG. 1. In an embodiment, superimposing each simulated view of the plurality of simulated views of representative part model 108 will create the simulated casing of representative part model 108. A simulated view, as described herein, is each side of the plurality of sides of representative part model 108, wherein each side has the digital filters of the different milling tools applied, as described in further detail above in reference to FIG. 1. The simulated casing, as described herein, is the aggregate of each simulated view of the plurality of simulated views of representative part model 108 wherein the simulated casing displays a super position of each machined surface of the plurality of machined surfaces of representative part model 108, as described in further detail above in reference to FIG. 1. In an embodiment, generating prospective part 132 is further configured to fill at least a void space of the simulated casing of representative part model 108. The at least a void space, as defined herein, is the space defined by the by each simulated view of the plurality of simulated views of representative part model 108, as described in further detail above in reference to FIG. 1. In an embodiment, filling the void space of the simulated casing of representative part model 108 further includes removing the simulated casing of representative part model 108 from the filled void space of the simulated casing of representative part model 108, as described in further detail above in reference to FIG. 1.

Still referring to FIG. 4, in an embodiment, generating, at simulation module 128, prospective part 132 may be generated as a function of at least a correlated compatible part element. At step 420, generating prospective part 132 may further include selecting a correlated dataset containing a plurality of data entries. Each correlated dataset contains at least a datum of manufactured part data and at least a first correlated compatible part element as a function of representative part model 108. Datasets may include any of the datasets as described herein. Datasets may be selected from internal database 136. Datasets contained within internal database 136 may be categorized and/or organized by any of the methodologies as described above in reference to FIG. 1 and FIG. 3. In an embodiment, at least a dataset may be selected by extracting at least a manufactured part data from representative part model 108 and matching the at least a manufactured part data to at least a correlated dataset containing at least an element of the at least a manufactured part data. In an embodiment, datasets contained within internal database 136 may be organized and categorized according to manufactured part data. For example, manufactured part data relating to a part to be manufactured out of Poly(methyl methacrylate) (PMMA) extracted from representative part model 108 may be matched to a dataset contained within internal database 136 that is categorized as belonging to a category of manufactured part data such as thermoplastic parts. In yet another non-limiting example, a part relating to a flanged bolt included in representative part model 108 may be matched to a dataset contained within manufactured part database that is categorized as belonging to a category of parts such as threaded mechanical parts, as described above in further detail in reference to FIG. 2.

With continued reference to FIG. 4, at step 420, generating prospective part 132 may further include at least a correlated compatible part element at unsupervised machine-learning model 200. At least a correlated compatible part element 204 is generated as a function of the representative part model 108 and the correlated dataset. Unsupervised machine-learning model 200 may include any of the unsupervised machine-learning models as described herein. Compatible part element may include any of the compatible part elements as described above in reference to FIGS. 1-3. Unsupervised machine learning module 200 may generate other unsupervised learning models including for example anomaly detection model, data clustering model, and other unsupervised learning models. In an embodiment, datasets utilized to generate unsupervised learning models, including hierarchical clustering model 208, may be obtained from internal database 136 as described above in more detail in reference to FIG. 2. In an embodiment, a plurality of datasets May be selected from internal database 136 and utilized to generate clustering unsupervised machine-learning model 200 as described above in more detail in reference to FIG. 2.

Still referring to FIG. 4, generating prospective part 132 further includes storing representative part model 108 in internal database 136. Generating prospective part 132 further includes storing prospective part 132 in internal database 136. Internal database 136, as described herein, includes any internal database 136, as described above in further detail in reference to FIG. 1 and FIG. 3. Datasets contained within internal database 136 may be categorized and/or organized by any of the methodologies as described above in reference to FIG. 1 and FIG. 3. Storing the representative part model 108 in internal database 136 may include any method and/or combination of methods of storing as described above in reference to FIGS. 1-3. Storing prospective part 132 in internal database 136 may include any method and/or combination of methods of storing as described above in reference to FIGS. 1-3.

Continuing to refer to FIG. 4, at step 425, system 100 displays prospective part 132 to user device 112. Displaying may include any means of displaying as described in the entirety of this disclosure. Displaying prospective part 132 to user device 112 may further comprise verifying, by the user at user device 112, prospective part 132, as described in further detail in reference to FIG. 1. Verifying may include, for example and without limitation, any means of confirmation, such as viewing prospective part 132 and selecting a button, as described above in more detail in reference to FIG. 1.

Referring now to FIGS. 5A-F, an embodiment of the depth buffer for each side of the plurality of sides of representative part model 108 at GPU 116 is illustrated. The depth buffer is generated by a process of rasterization, wherein the depth represents the traveling distance of where a ray hits the surface of the side of representative part model 108. Rays are shot from a side of representative part model 108 in the perpendicular direction. The depth buffer for each side of the plurality of sides is defined for only the visible area of each side of representative part model 108, wherein all surfaces of the part to be machined need to be visible from one of the sides in order to machine the part, as described in further detail above in reference to FIG. 1.

FIGS. 5A-F display the 3D rendering of the rasterization for a part contained within representative part model 108 with six sides. Each side of the six sides are displayed in each figure of FIGS. 5A-F.

Referring now to FIGS. 6A-F, an embodiment each simulated view of the plurality of simulated views of representative part model 108 on simulation module 128 is illustrated. A simulated view, as described herein, is each side of the plurality of sides of representative part model 108, wherein each side has the digital filters of the different milling tools applied, as described in further detail above in reference to FIG. 1. FIGS. 6A-F displays the 3D rendering of each simulated view of the plurality of simulated views for a part for manufacture contained within representative part model 108 with six sides. Each side of the six sides are displayed in each figure of FIGS. 6A-F.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
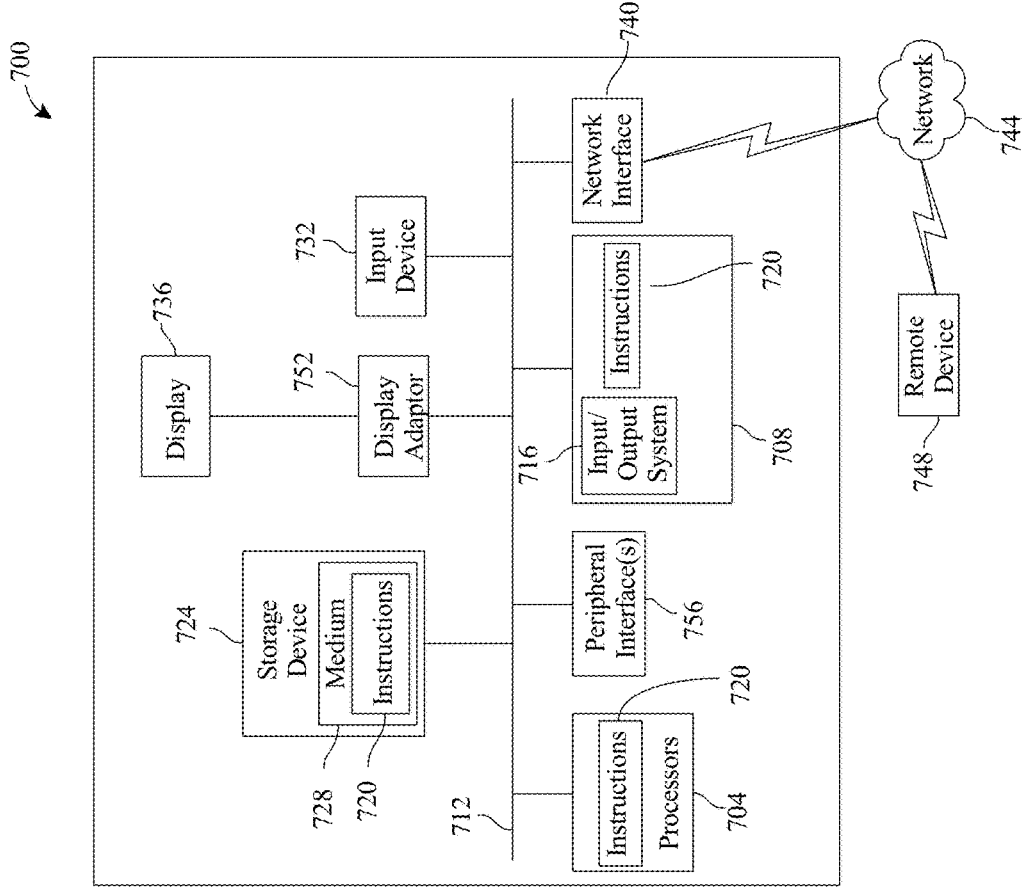
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device!! 36 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of generating an instant design for manufacturability of a part at a computing device, the method comprising:
   receiving a representative part model, wherein the representative part model comprises a plurality of sides;
   generating, at a graphics processing unit, a depth buffer model of the representative part model, wherein the depth buffer model of the representative part model further comprises a plurality of depth buffers, the plurality of depth buffers including a depth buffer for each side of the plurality of sides of the representative part model;
   determining, at an assignment module operating on the graphics processing unit, each orientation of a plurality of orientations of the representative part model as a function of each depth buffer of the plurality of depth buffers, wherein determining each orientation of the plurality of orientations comprises:
      identifying at least an unreachable zone of the depth buffer model that is required to be machined in the orientation by running one or more digital filters on each depth buffer of the plurality of depth buffers of each side of the representative part model;
   generating at least a compatible part element as a function of the representative part model using an anomaly detection module configured to observe and find outliers relating to the representative part model, wherein generating the at least a compatible part element comprises:
      receiving training data, wherein the training data correlates a plurality of representative part model data to a plurality of representative part model side data;
      training, iteratively, the anomaly detection module using the training data, wherein training the machine learning module includes retraining the anomaly detection module with feedback from previous iterations of the anomaly detection module; and
      determining one or more outliers as a function of the representative part model using the trained anomaly detection module; and
      generating the at least a compatible part element as a function of the one or more outliers;
   generating, at a simulation module operating on the graphics processing unit, a prospective part including a prospective part model and a simulated casing as a function of the at least a compatible part element, wherein generating the prospective part further comprises:
      generating the simulated casing of the representative part model, wherein generating the simulated casing further comprises:
         generating a simulated view for each side of the plurality of sides of the representative part model;
         superimposing each simulated view of the plurality of simulated views of the representative part model over the representative part model, wherein the superposition creates the simulated casing; and
         generating the prospective part as a function of instrument reachability by applying a digital filter corresponding to a shank collision instrument reachability and the digital filter corresponding to tool holder collision instrument reachability; and
      filling at least a void space of the simulated casing of the representative part model;
   displaying the prospective part to a user device; and
   producing the prospective part by utilizing a manufacturing process, wherein the manufacturing process comprises additive manufacturing including a three-dimensional printing technique.

2. The method of claim 1, wherein generating the depth buffer model of the representative part model further comprises:
   generating the depth buffer for each side of the plurality of sides of the representative part model; and
   superimposing each depth buffer on a corresponding side of the plurality of sides of the representative part model.

3. The method of claim 1, wherein determining each orientation of the plurality of orientation further comprises:
   generating a geodesic representative part model, wherein the geodesic representative part model includes the representative part model encased in a geodesic sphere; and
   computing a thickness direction datum of the geodesic representative part model.

4. The method of claim 1, wherein generating the prospective part further comprises:
   storing the representative part model in an internal database; and
   storing the prospective part in the internal database.

5. The method of claim 1, wherein filling the at least a void space of the simulated casing of the representative part model further comprises removing the simulated casing of the representative part model from the at least a filled void space of the simulated casing of the representative part model.

6. The method of claim 1, wherein generating the prospective part further comprises:
   selecting a correlated dataset containing a plurality of data entries wherein each data entry contains at least a datum of manufactured part data and at least a correlated compatible part element as a function of the representative part model.

7. The method of claim 6, wherein selecting the correlated dataset further comprises retrieving the correlated dataset from an internal database.

8. The method of claim 1, wherein generating the prospective part further comprises:
generating, at an unsupervised machine-learning model, at least a correlated compatible part element as a function of the correlated dataset.

9. A system for generating an instant design for manufacturability of a part, the system comprising a computing device designed and configured to:
receive a representative part model, wherein the representative part model comprises a plurality of sides;
generate, at a graphics processing unit, a depth buffer model of the representative part model, wherein the depth buffer model of the representative part model further comprises a depth buffer for each side of the plurality of sides of the representative part model;
determine, at an assignment module operating on the graphics processing unit, each orientation of the plurality of orientations of the representative part model as a function of each depth buffer of the plurality of depth buffers, wherein determining each orientation of the plurality of orientations comprises:
identifying at least an unreachable zone of the depth buffer model that is required to be machined in the orientation by running one or more digital filters on each depth buffer of the plurality of depth buffers of each side of the representative part model;
generate at least a compatible part element as a function of the representative part model using an anomaly detection module configured to observe and find outliers relating to the representative part model, wherein generating the at least a compatible part element comprises:
receiving training data, wherein the training data correlates a plurality of representative part model data to a plurality of representative part model side data;
training, iteratively, the anomaly detection module using the training data, wherein training the machine learning module includes retraining the anomaly detection module with feedback from previous iterations of the anomaly detection module; and
determining one or more outliers as a function of the representative part model using the trained anomaly detection module; and
generating the at least a compatible part element as a function of the one or more outliers;
generate, at a simulation module operating on the graphics processing unit, a prospective part and a simulating casing as a function of the at least a compatible part element, wherein generating the prospective part further comprises:
generating a simulated casing of the representative part model, wherein generating the simulated casing further comprises:
generating a simulated view for each side of the plurality of sides of the representative part model;
superimposing each simulated view of the plurality of simulated views of the representative part model over the representative part model, wherein the superposition creates the simulated casing; and
generating the prospective part as a function of instrument reachability by applying a digital filter corresponding to a shank collision instrument reachability and the digital filter corresponding to tool holder collision instrument reachability; and
filling at least a void space of the simulated casing of the representative part model;
display the prospective part to a user device; and
produce the prospective part by utilizing a manufacturing process, wherein the manufacturing process comprises additive manufacturing including a three-dimensional printing technique.

10. The system of claim 9, wherein generating the depth buffer model of the representative part model further comprises:
generating the depth buffer for each side of the plurality of sides of the representative part model; and
superimposing each depth buffer on a corresponding side of the plurality of sides of the representative part model.

11. The system of claim 9, wherein determining each orientation of the plurality of orientation further comprises:
generate a geodesic representative part model, wherein the geodesic representative part model includes the representative part model encased in a geodesic polygon; and
compute a thickness direction datum of the geodesic representative part model.

12. The system of claim 9, wherein generating the prospective part further comprises:
storing the representative part model in an internal database; and
storing the prospective part in the internal database.

13. The system of claim 9, wherein filling the at least a void space of the simulated casing of the representative part model further comprises removing the simulated casing of the representative part model from the at least a filled void space of the simulated casing of the representative part model.

14. The system of claim 9, wherein generating the prospective part further comprises:
selecting a correlated dataset containing a plurality of data entries, wherein each dataset contains at least a datum of manufactured part data and at least a correlated compatible part element as a function of the representative part model.

15. The system of claim 14, wherein selecting the correlated dataset further comprises retrieving the correlated dataset from the internal database.

16. The system of claim 9, wherein generating the prospective part further comprises:
generating, at an unsupervised machine-learning model, at least a correlated compatible part element as a function of relating the representative part model to at least a part element.

* * * * *